United States Patent [19]

Fukushima et al.

[11] Patent Number: 5,084,122
[45] Date of Patent: Jan. 28, 1992

[54] METHOD FOR MANUFACTURING AN AIR BAG ATTACHMENT STRUCTURE

[75] Inventors: Shigeyoshi Fukushima; Hidehito Sogi, both of Aichi, Japan

[73] Assignee: Toyo Tire & Rubber Co., Ltd., Osaka, Japan

[21] Appl. No.: 497,162

[22] Filed: Mar. 20, 1990

Related U.S. Application Data

[62] Division of Ser. No. 77,338, Jul. 24, 1987, abandoned.

[30] Foreign Application Priority Data

Jul. 28, 1986 [JP] Japan .................. 61-115548[U]

[51] Int. Cl.⁵ .............................. B29C 59/10
[52] U.S. Cl. .................. 156/252; 156/242; 156/245; 156/285; 280/728; 280/730; 280/731; 280/732; 280/737
[58] Field of Search .............. 156/242, 245, 252, 253, 156/285; 280/728, 730, 731, 732, 733, 743, 737

[56] References Cited

U.S. PATENT DOCUMENTS

| | | | |
|---|---|---|---|
| 3,622,176 | 11/1971 | Byer | 280/732 |
| 3,632,136 | 1/1972 | Foltz | 280/150 AB |
| 3,640,546 | 2/1972 | Brawn | 280/150 AB |
| 3,778,085 | 12/1973 | Lipkin | 280/150 AB |
| 3,799,573 | 3/1974 | McDonald | 280/150 AB |
| 3,853,334 | 12/1974 | Auman et al. | 280/150 AB |
| 3,907,330 | 9/1975 | Kondo et al. | 280/731 |
| 4,148,503 | 4/1979 | Shiratori et al. | 280/731 |
| 4,246,213 | 1/1981 | Takamatsu et al. | 280/728 |

FOREIGN PATENT DOCUMENTS 2503447 8/1975 Fed. Rep. of Germany .
55-36137 3/1980 Japan .

*Primary Examiner*—Caleb Weston
*Attorney, Agent, or Firm*—Sterne, Kessler, Goldstein & Fox

[57] ABSTRACT

An air bag structure for an automobile is provided in an outlet provided in an instrument panel. The air bag is supported for expansion through the outlet and surface material covers the instrument panel including the outlet and includes stitch-like slits in registry with the outlet to cause the surface material to tear along predetermined lines upon expansion of the air bag.

5 Claims, 1 Drawing Sheet

METHOD FOR MANUFACTURING AN AIR BAG ATTACHMENT STRUCTURE

This application is a division, of application Ser. No. 07/077,338, filed 7/24/87, abandoned.

FIELD OF THE INVENTION

The present invention relates to an automobile air bag attachment structure. More particularly, the present invention relates to an assembly for storing an air bag before it is activated and for ejecting the air bag when activated.

BACKGROUND OF THE INVENTION

An air bag is installed in a motor vehicle as a device to protect the driver and/or passenger from injury. During a collision, the occupant of the vehicle is often thrown forward causing the head or upper body to hit the steering wheel or dashboard. A rapidly inflating air bag prevents bodily contact with these parts of the vehicle. Present air bag systems are designed so that the structure for steering the air bag cause the space in front of the driver to be narrow and small. This may hinder operation of the vehicle and makes access to and from the driver's seat difficult.

One method of containing an air bag is to locate an opening in front of the driver and/or passenger on the instrument panel. The opening is trimmed with a molding. A reaction plate is located behind the air bag. The opening is covered by a door consisting of a lower piece attached to the reaction plate on the bottom of the chamber and an upper piece attached to the reaction plate along the top of the container. The door is opened by the force exerted by the expanding air bag.

An improvement has been proposed in that a recess portion is formed in the rear side surface of the air bag door at a portion in the upper vicinity of a connection portion between the lower end edge portion of the air bag door and the reaction plate. This reduces the thickness of the air bag door and is described in Japanese Patent Unexamined Publication No. 110338/1983).

This structure for enclosing an air bag results in having the door swing downward as the air bag expands. When the door is opened in this fashion there is a likelihood of it hitting the occupant's legs, possibly causing injury. This method also includes a separate molding that must be manufactured and installed separately. This is a disadvantage because it increases the number of parts needed and the attachment position of the molding on the instrument panel is limited in design.

OBJECTS AND SUMMARY OF THE INVENTION

An object of the present invention is an air bag attachment requiring a minimum number of parts.

Another object of the present invention is an air bag attachment with a door that, when open, does not come into contact with or injure the occupant of the vehicle.

To achieve these and other objects, and in accordance with the purpose of the invention, as embodied and broadly described herein, an air bag attachment structure comprises an instrument panel constructed of a selected core material having an outlet therein; an air bag, including means supporting the air bag, in alignment with said outlet for expansion through the outlet in the core material; and a surface material covering the core material of the instrument panel including the outlet, the surface material having a plurality of stitch-like slits formed in a selected row configuration in registry with the outlet causing the surface material to tear along the row configuration upon expansion of the air bag.

BRIEF DESCRIPTION OF THE DRAWINGS

The accompanying drawings, which are incorporated in and constitute a part of this specification, illustrate two embodiments of the invention and, together with the description, serve to explain the principles of the invention.

DESCRIPTION OF THE PREFERRED EMBODIMENT

Figure 1:
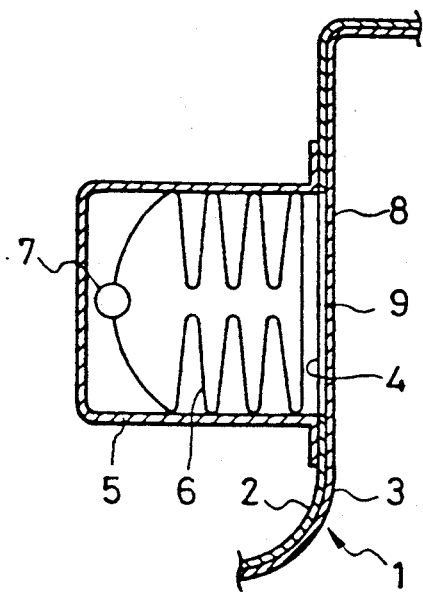
FIG. 1 is a side view in section showing an embodiment of the air bag attachment structure according to the present invention.

The present invention provides an air bag attachment structure. In FIG. 1, an instrument panel 1 located in front of the driver's seat is made of a core material 2 and a surface material 3. An opening defining an air bag projection outlet 4 is formed in the core material 2. An air bag accommodation box 5 is located on the instrument panel 1 at the side opposite to the driver seat. A collapsed air bag connected to a high-pressure gas discharge outlet 7 is accommodated in the air bag accommodation box 5. Further, the air bag accommodation box 5 is attached to an outer surface of the core material 2 on the instrument panel 1 in such a manner that the open portion of the air bag accommodation box 5 is closely fitted onto the circumference of the air bag projection outlet 4 formed in the core material 2. A portion of the surface material 3 covering the air bag projection outlet 4 forms an air bag cover portion 8 in which stitch-like slits 9 are formed in the shape of grooves.

Figure 2:
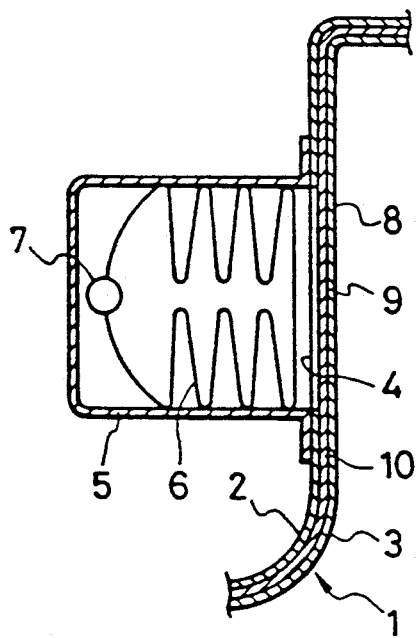
FIG. 2 is a side view in section showing another embodiment of the air bag attachment structure according to the present invention.

FIG. 2 shows another embodiment according to the present invention. In this embodiment, in an instrument panel 1, an elastic foaming material 10 is laminated on a rear surface of surface material 3, and an air bag cover portion 8 is made of the same material as the surface material 3 and the elastic foaming material 10. Stitch-like slits are formed in the form of grooves in the surface material 3.

Figure 3:
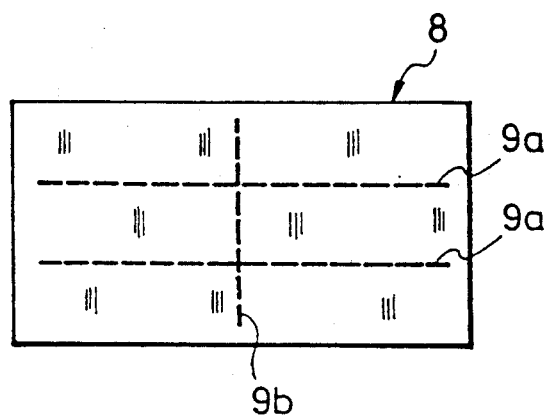
FIG. 3 is a front view showing the stitch-like slits formed in the air bag cover portion.
Figure 4:
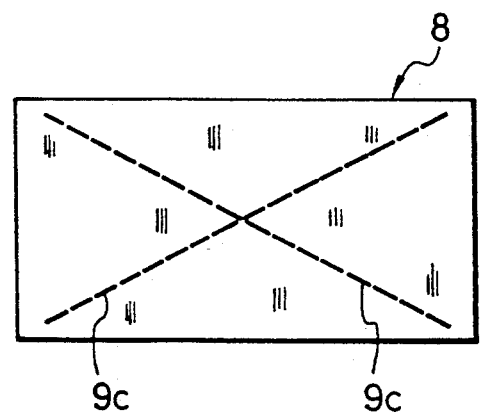
FIG. 4 is a front view showing the stitch-like slits in another state.

FIGS. 3 and 4 are front views showing the stitch-like slits formed in the air bag cover portion 8. In FIG. 3, two rows of stitch-like slits 9a are formed transversely parallel to each other, and another row of stitch-like slits 9b are formed to extend longitudinally at a central position to cross the rows of stitch-like slits 9a at right angles. In FIG. 4, two rows of stitch-like slits 9c are formed to obliquely cross each other at a central position.

The core material 2 forming the instrument panel 1 may be made of metal or of a known rigid material molded into a desired shape by using synthetic resin such as a copolymer of acrylonitrile butadiene styrene (ABS resin), polyphenylene oxide (PPO resin), a copolymer of glass fiber reinforced acrylonitrile styrene (PPG resin), or the like.

For the surface material 3 forming the instrument panel 1, it is preferable to use soft polyvinyl chloride having a thickness of 0.1-2.0 mm, preferably 0.5-1.5 mm. Further, the elastic foaming material 10 laminated on the rear surface of the surface material 3 may be formed of a material having a foaming magnification of 1.5 to 50, preferably, 5-20, and a thickness of 0.1-10 mm, preferably, 0.5-5 mm and selected from a group of thermoplastic resins such as polyvinyl chloride, polypropylene, polyethylene, polyester, polyamide, and the like, and a group of thermosetting resins such as polyurethane, polyurethane urea, phenol resin, epoxy resin, and the like.

The plan of the stitch-like slits formed in the air bag cover portion 8 may be the crossing type or the bent type. The stitch-like slits of the crossing type may be formed of at least two rows of slits intersecting each other as illustrated in FIGS. 3 and 4. The arrangement of the stitch-like slits of the crossing type is not limited to those shown in FIGS. 3 and 4. The bent type may be a U-shaped, a V-shaped, etc. Alternatively, the stitch-like slits may be arranged along a curve. The rows of stitch-like slits of the crossing type may be used together with those of the bent type. In the rows of stitch-like slits of the crossing type or of the bent type, the number and length of slits may be suitably selected to make it possible to improve the operation of the air bag cover portion 8. However, the number of slits must not be so large that a center portion of the air bag cover portion 8 is torn and scattered as many broken pieces when the air bag is inflated. It is preferable to select the length of each of the stitches in the slits to be 2-10 mm; an interval therebetween, 0.1-2 mm; and a width thereof, 0.5-2.5 mm.

To produce the surface material 3 or the lamination sheet made of the surface material 3 and the elastic foaming material 10, a known molding method such as a slush molding method, a rotational molding method, a vacuum forming method, or the like can be utilized. However, in order to form the stitch-like slits, which are a feature of the invention, in the air bag cover portion simultaneously in the step of molding the surface material 3 or the lamination sheet, it is preferable to utilize the surface material producing method employing a vacuum slash process, which has been proposed by the applicant of this application in Japanese Patent Application No. 18564/1986. That is, in the foregoing surface material producing method, a slush molding metal mold in which protrusions corresponding to the stitch-like slits are arranged at a position corresponding to the air bag cover portion is used to form the stitch-like slits simultaneously with the formation of the surface material.

Further, in the step in which the surface material is stuck onto the core material so as to produce the instrument panel, a conventionally used method utilizing adhesives is employed. However, it is preferable to utilize a vacuum pressure welding method using a vacuum forming mold.

EXAMPLE

A rectangular air bag projection outlet having a size of 100×200 mm was formed in a core material made of ABS resin having a thickness of 5 mm. Stitch-like slits having a stitch length of 4 mm, a stitch interval of 1.0 mm, and a stitch width of 0.6 mm were formed in the shape shown in FIG. 3 in the air bag cover portion. The cover portion was formed in the same shape as the air bag projection outlet, which consists of a surface material of polyvinyl chloride having a thickness of 0.6 mm and a polyurethane foaming material having a thickness of 3 mm and having a foaming magnification of 10. When the air bag was expanded with pressure of 5 Kg/cm$^2$, the stitch-like slits were torn to form an opening, so that the expanded air bag was projected toward the driver.

According to the present invention, the stitch-like slits are formed in the air bag cover portion, and, therefore, the air bag cover portion is broken open when by the relatively small expanding pressure caused by filling the air bag. The air bag cover portion is not scattered in the form of broken pieces that could harm the driver or a passenger. The design of the air bag cover portion can be improved by changing the stitch-like slits. Further, in the case where the elastic foaming material is laminated on the surface material, a buffer effect is generated, even when the car is shocked to an extent that is insufficient to activate the air bag. Moreover, the slits in the air bag cover portion can be formed in the step of molding the instrument panel, and therefore it is possible to produce the air bag cover portion easily and inexpensively. Further, according to the present invention, the air bag accommodation box is attached to the instrument panel at the side opposite to a driver so that the space for the driver is not decreased and the driver's operation of the car is not impaired.

What is claimed is:

1. A method for manufacturing an air bag device for protecting an occupant(s) in a motor vehicle, comprising the steps of:
   (a) forming a mold for a surface material for covering an air bag, said mold being formed with protrusions of a desired size and shape;
   (b) producing said surface material from said mold, said protrusions forming stitch-like slits on said surface material simultaneously with the production of said surface material by said mold; and
   (c) vacuum pressure welding said surface material onto a core material using a vacuum forming mold so as to adhere said surface material to said core material to thereby produce an instrument panel.

2. The method of claim 1, wherein forming said mold of step (a) comprises the step of forming said protrusions such that said stitch-like slits of step (b) are formed so that the length of said stitch-like slits will be between 2 and 10 mm, and the width of said slits will be between 0.5 and 2.5 mm.

3. The method of claim 2, comprising the step of attaching to said surface material of step (c) an elastic foaming material of polyurethane,
   said elastic foaming material being adhered to said core material.

4. A method for manufacturing an air bag for protecting an occupant(s) in a motor vehicle, comprising the steps of:
   (a) molding a core material for an instrument panel having an air bag projection outlet;
   (b) forming a mold for a surface material for covering said air bag projection outlet, and forming said surface material of polyvinyl chloride having a thickness of between 0.1 and 2 mm, said mold being formed with protrusions;
   (c) producing said surface material from said mold, said protrusions forming stitch-like slits on said surface material simultaneously with the production of said surface material, and said protrusions being positioned to form said stitch-like slits having a length between 2 and 10 mm, and a width between 0.5 and 2.5 mm;
(d) vacuum pressure welding said surface material onto said core material using a vacuum forming mold to adhere said surface material to said core material to thereby produce an instrument panel;
(e) disposing an air bag into an accommodation box;
(f) affixing said air bag accommodation box to said core material on the opposite side of said core material from the occupant of the motor vehicle; and
(g) attaching said air bag to a high-pressure gas discharge outlet.

5. The method of claim 4, comprising the step of attaching to said surface material of step (b) an elastic foaming material of polyurethane having a thickness of between 0.5 and 5 mm,
said elastic foaming material being adhered to said core material.

* * * * *